United States Patent [19]

Andreev et al.

[11] Patent Number: 5,647,885
[45] Date of Patent: Jul. 15, 1997

[54] METHOD OF COMPLEX PROVIDING USER WITH MINERAL SALTS AND/OR FERTILIZERS, AND SYSTEM FOR EFFECTING SAME

[75] Inventors: Alexandr Anatolievich Andreev; Vyacheslav Evgenievich Bukovsky, both of Odessa, Ukraine

[73] Assignee: Nauchno-Inzhenerny Tsentr "Infomir", Odessa, Ukraine

[21] Appl. No.: 331,495

[22] PCT Filed: Dec. 28, 1992

[86] PCT No.: PCT/RU92/00256

§ 371 Date: Oct. 27, 1994

§ 102(e) Date: Oct. 27, 1994

[87] PCT Pub. No.: WO94/06729

PCT Pub. Date: Mar. 31, 1994

[30] Foreign Application Priority Data

Sep. 24, 1992 [RU] Russian Federation ............... 5057974
Dec. 9, 1992 [RU] Russian Federation ............. 92008492

[51] Int. Cl.$^6$ .............................. C05C 9/00; C05C 1/00; C05D 1/02
[52] U.S. Cl. .......................... 71/28; 71/29; 71/30; 71/59; 71/63; 71/64.01
[58] Field of Search ..................... 71/28–30, 59, 71/63, 64.01

[56] References Cited

U.S. PATENT DOCUMENTS 4,154,258   5/1979   Duda et al. ............................. 137/268

FOREIGN PATENT DOCUMENTS 215076   10/1984   Germany.
3824744   1/1990   Germany.

OTHER PUBLICATIONS

M.E. Pozin "Technology of Mineral Fertilizer Production" 1974, Publishing House Khimia, Moscow, pp. 225, 249 and 269.

*Primary Examiner*—Ferris Lander
*Attorney, Agent, or Firm*—Collard & Roe, P.C.

[57] ABSTRACT

The essence of the invention resides in that in production of a solid product obtained in a reactor (1) by way of synthesis from source components and serving as a raw material for preparing a solution of salt and/or fertilizer, a pulp is obtained and then loaded in a container (2) at fixed temperatures corresponding to crystallization of the product to a hydraulically compacted state of preset degrees. The same container (2) is used for transportation and storage of the hydraulically compacted crystals. The solution of salt and/or fertilizer is prepared within preset concentration and dosage just before its application by the user (4), and the crystals are dissolved in the same container (2). If required the product is transferred into another container.

5 Claims, 3 Drawing Sheets

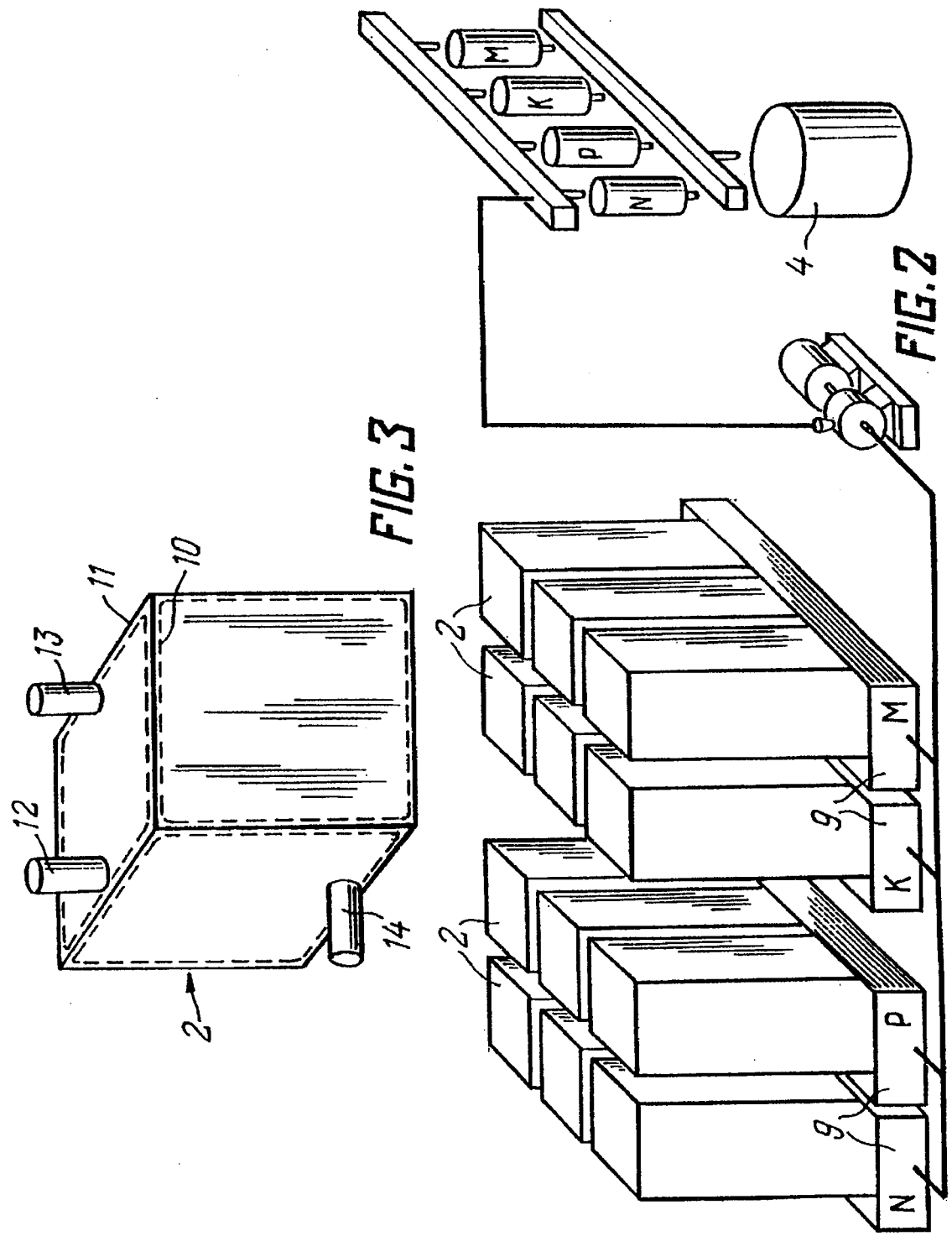

5,647,885

METHOD OF COMPLEX PROVIDING USER WITH MINERAL SALTS AND/OR FERTILIZERS, AND SYSTEM FOR EFFECTING SAME

TECHNICAL FIELD

The present invention relates to technology of mineral salt and fertilizer production and is more particularly concerned with a method of complex providing a user with mineral salts and/or fertilizers, and a system for effecting the same.

BACKGROUND ART

Known in the prior art are a method and a system for production of mineral fertilizers, for example, carbamide (M. E. Pozin "Technology of Mineral Fertilizer Production", 1974, Publishing House "Khimia", Moscow, p. 249). Production of the product resides in synthesizing carbamide from ammonia ($NH_3$) and carbon dioxide ($CO_2$) with subsequent evaporation, filtration, centrifuging, granulation and treatment with a parting agent. The granulated carbamide is the end product. However, such a system requires a substantial consumption of energy, reduction of this system to practice is ecologically harmful, and the product proper contains increased concentrations of impurities, for example, biuret, which is dangerous to human health and environment. In addition, this system fails to produce a product suitable for a wide use, requires substantial economic expenditures and has an adverse effect on the enviroment when this product is transported, transferred and stored.

Known in the prior art are a method and a system for production of ammonium nitrate (M. E. Pozin "Technology of Mineral Fertilizer Production", 1974, Publishing House "Khimia", Moscow, p. 269) based on neutralization of nitric acid by ammonia. Neutralization of nitric acid results in formation of an ammonium nitrate solution which should be evaporated for obtaining a solid product. An amount of reaction heat liberated during the appropriately organized production process turns out to be sifficient for evaporating the bulk of water introduced together with nitric acid and for obtaining a high-concentrated solution. In a traditional method of producing ammonium nitrate, the reaction heat is removed in the neutralizer in which the boiling and evaportation of the solution proceed concurrently. The melt is granulated in a stream of air in a tower granulator. Obtained granules are treated with a parting agent. Such a system is labour-consuming and rigidly bound to concentration of the product, and contains ecologically harmful additives. In addition, this system is explosion-hazardous in the process of production, transportation and storage.

Known in the prior art are a method and a system for production of potassium chloride from sylvinite ores (M. E. Pozin "Technology of Mineral Fertilizer Production", 1974, Publishing House "Khimia", Moscow, p. 225) based on leaching out ground sylvinite by means of a hot mother liquor obtained after crystallization of potassium chloride which then passes from sylvinite into the solution, while the sodium chloride almost completely remains in the reject, cooling the liquor, crystallization of the potassium chloride and its separation from the mother liquor and on drying. However, this system is not ecologically pure and is economically expensive in production, transportation and storage. Such a system leads to formation of a great amount of waste products.

Known in the prior art are a method and a system of complex providing a user with mineral salts and/or fertilizers (Oil and Gas, Jan. 28, 1992, No. 55,0) anticipating the use of industrial transport means and combining all the operations from the production of mineral salts and/or fertilizers up to their delivery to the user. The method involves production of a solid product in a reactor by way of synthesizing it from source components. Then, at a stage of production the end product is prepared in a liquid state in a reservoir of a device for preparation of the solution and is transferred and transported in special containers, for example, cisterns and tankers. At a final stage, it is anticipated that the solution will be poured into a reservoir for application by the user.

Reduction of the known method to practive and use of the given system result in obtaining a product with a rigidly fixed concentration, for example, carbamidoammonium nitrate (CAN) with increased content of ecologically harmful additives which results from the today's standard production processes. When the solution is used, there constantly exists the danger of an accidental spill of this corrosive liquid, similar to petroleum products, ecologically harmful to human health and environment. This system is insufficiently effective from the economic point of view, as on the one hand, the production of the end product involves substantially high material expenditures and on the other hand, the liquid containing 50% of water should be carried only on specialized transport means. In addition, the process or production and transportation is substantially prolonged.

DISCLOSURE OF THE INVENTION

The present invention is essentially aimed at providing a method and a system for providing a user with mineral salts and/or fertilizers ensuring the provision of an intermediate product at the production stage allowing the container to be used for transportation and storage of the end product at the production stage and preparation of the solution of mineral salt and/or fertilizer at the final stage.

This aim is attained by that in a method of complex providing a user with mineral salts and/or fertilizers comprising the production of a solid product from source components used as a raw material for preparing a solution of mineral salt and/or fertilizer, transportation, transfer and storage, according to the invention, in the production of a solid product a pulp is obtained in the process of synthesis and is loaded into a container at fixed temperatures corresponding to crystallization of the product to a hydraulically compacted state of preset degrees, the product is transported and stored in the form of hydraulically compacted crystals in the same container, and the solution of mineral salt and/or fertilizer is prepared within preset concentration and dosage just before its application by the user.

For transportation and storage, it is expedient to transfer the product into a stationary container.

This aim is also attained by that in a complex system of providing a user with mineral salt and/or fertilizer comprising a reactor for synthesizing a product from a raw material, a container for transportation and storage of the product, a device for transfer of the product and a device for preparing the solution of mineral salt and/or fertilizer, according to the invention, the container for transportation and storage of the product is simultaneously used as a container for loading the pulp obtained in the process of product synthesis, and as a reservoir of the device for preparing the solution of mineral salt and/or fertilizer.

It is desirable that the container for transportation and storage of the product be made in the form of two reservoirs inserted one into the other and that the inner reservoir be made of a porous material, for example, polypropylene and the outer reservoir be made of a water-tight material, for example, polyethylene and be provided with means for connection of at least three pipelines to said outer reservoir.

To facilitate the process of producing ready-for-use solutions with preset concentrations, it is expedient that the container for transportation and storage of the product, when used as a device for preparing the solution of mineral salt and/or fertilizer, be connected with the aid of quick-detachable locking means, a circulating pipeline and a solution outlet pipeline to a reservoir for bringing the solution to a preset concentration and be provided with a tapping-off pipe connected for the circulating pipeline, disposed level with a solution level sensor installed inside the reservoir for bringing the solution to a preset concentration, and a pipe connection for outlet of the ready-for-use solution disposed in the immediate vicinity of the bottom of said reservoir level with a solution density sensor, the pipeline for outlet of the solution being arranged inside the reservoir for bringing the solution to a preset concentration with a clearance in relation to walls of said reservoir and above a surge damper.

BRIEF DESCRIPTION OF THE DRAWINGS

The invention will now be described in detail with reference to the accompanying drawings illustrating a specific embodiment thereof, in which:

FIG. 2 is a flow diagram of preparing liquid complex fertilizers and mineral salts;

FIG. 3 is a general view of the container for transportation and storage of the product, according to the invention;

BEST MODE FOR CARRYING OUT THE INVENTION

Figure 1:
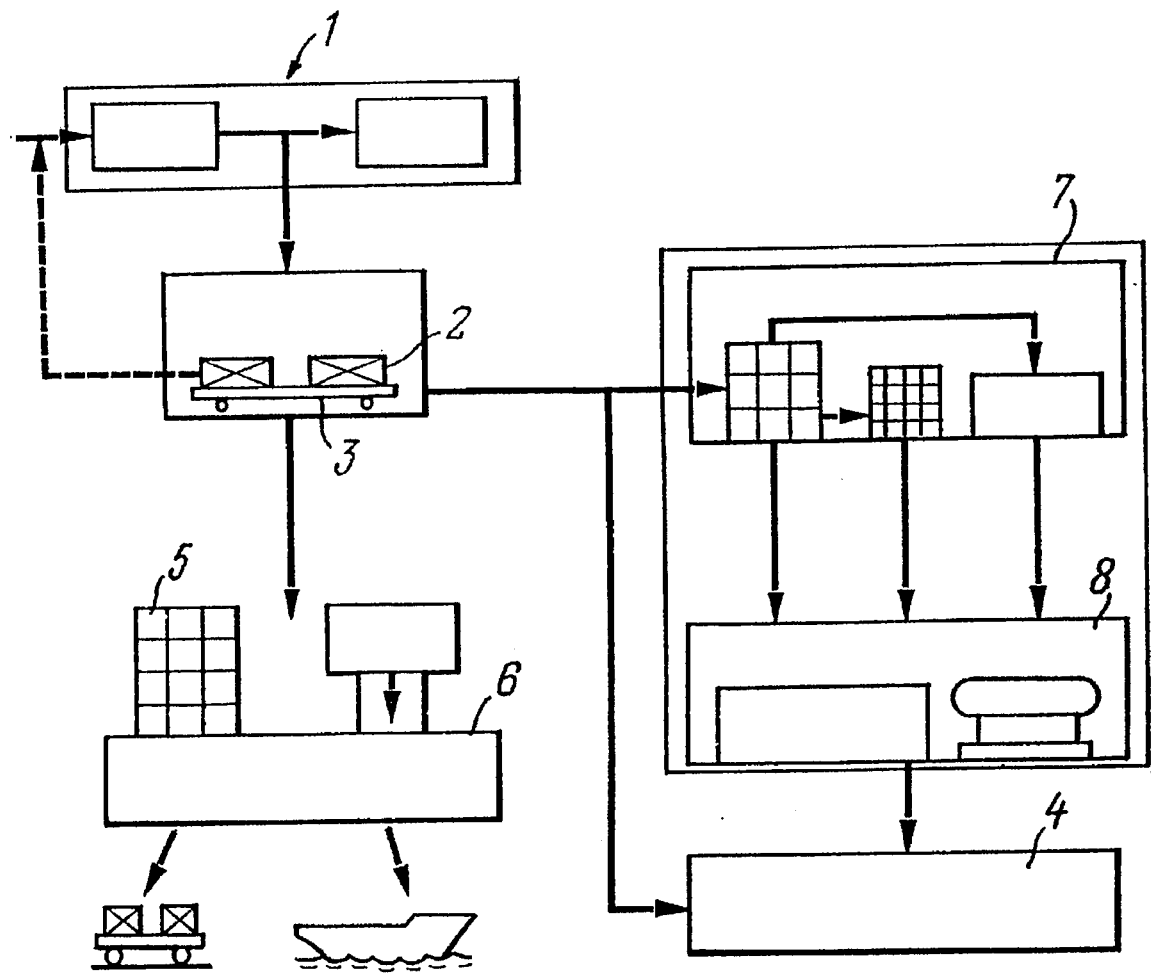
FIG. 1 is a flow diagram of the integrated system of providing a user with mineral salts and/or fertilizers, according to the invention.

A method of complex providing a user with mineral salts and/or fertilizers effected according to the invention in a system illustrated in FIG. 1 comprises, production of a solid product from source components by way of its synthesis in a reactor 1 after which the synthesized product obtained in the form of a pulp is loaded into a container 2 wherein crystallization is accomplished simultaneously with separation of a mother liquor. The mother liquor is used again as a source component for producing the solid product. As the mother liquor leaves the zone of crystallization the formed crystals are hydraulically compacted to preset degrees. The container 2 with the hydraulically compacted crystals is delivered either to a storehouse or for loading on a transport vehicle 3. The containers 2 are delivered in an unchanged condition to a user 4 and if it becomes necessary to transfer the containers 2 on other kind of transport, they are delivered into a device 6 for transfer. In compliance with requirements of the user 4 in solutions of mineral salts and fertilizers of hydraulically compacted crystals, said solutions are prepared with preset concentration and dosage in a device 7 in pools 8. For obtaining complex solutions of mineral salts and fertilizers, the containers 2 (FIG. 2) with required components are installed in dissolving units 9. Complex solution NPK with concentration and dosage preset by the user 4 are obtained by way of delivering water into the dissolving units 9.

The proposed method of providing the user with mineral salts and fertilizers will now be described with reference to examples that follow.

EXAMPLE 1

The processes of synthesis and distillation used in the existing production of carbamide were left unchanged and after distillation the pulp was tapped off for delivery into the container 2. From the distiller the pulp with a concentration of 72–76% and at a temperature of 80° C. was delivered into a double-pipe heat exchanger wherein the pulp was cooled down to a temperature of 55.5° C. and the solution was supersaturated. Further, the pulp was delivered into the soft polypropylene container 2 with a polyethylene jacket having a tapping-off pipe connection for mother liquor in which crystallization of the carbamide and separation of the mother liquor were accomplished. The mother liquor was returned into production. As the carbamide cooled down in the container 2, the crystals were hydraulically compacted. The end product comprised 0.14% of biruet and up to 4% of water with a density of 1 g/cm$^2$.

Quality of the end product obtained in compliance with the proposed scheme was much more higher than quality of the product obtained by the known method (content of biuret amounts to 0.14% instead of 0.8%) and the most power-intensive processes, such as evaporation, filtration, centrifuging and granulation were cancelled.

EXAMPLE 2

In a manner analogous to Example 1, evaporation, drying and granulation were cancelled from the ammonium chloride production process and the pulp having a concentration of 80–82% and a temperature of 92°–96° C. was delivered from the neutralizer into the heat exchanger wherein it cooled down to a temperature of 60° C. and passed into the stage of supersaturation. Thereafter, the pulp was delivered into the container 2, in which the mother liquor was separated from the end product. The ammonium nitrate obtained by this method had a humidity over 3% which made it possible to eliminate the production explosion hazard.

In addition to these two examples the Applicant may present, if required, other examples illustrating the production of other mineral salts, potassium salts in particular the solutions of which have been obtained in a laboratory.

The container 2 (FIG. 3) designed for transportation and storage of the product and simultaneously used in production of a solid product and preparation of solutions thereof is made in the form of reservoirs 10 and 11 inserted one into the other with a clearance provided therebetween, the inner reservoir 10 being made of a porous material, for example, polypropylene and the outer reservoir 11 being made of water-tight material, for example, polyethylene. The outer reservoir 11 is provided with means 12, 13, 14 for connection of at least three pipelines.

When the container 2 (FIG. 4) is used as a reservoir for dissolution of crystals, it is connected through the medium of quick-detachable locking means 15, for example, cam-type locks or clamps, to a solvent delivery pipeline 16, circulating pipeline 17 with a pump 18 and to a solution outlet pipeline 19. The pipeline 16 is provided with a shut-off valve 20 operated from a solution level sensor 21 installed in a reservoir 22 for bringing the solution to a preset concentration. The solution outlet pipeline 19 is installed inside the reservoir 22 with a clearance in relation to the walls thereof and above a surge damper 23. In its lower portion the reservoir 22 is communicated with a ready-for-use solution outlet pipe connection 24 which internally accommodates a valve 25 which operates on a signal received from a solution density sensor 22 disposed in the reservoir 22. A tapping-off pipe connection 27 for the circulating pipeline 17 is provided in the upper portion of the reservoir 22 at a height of the solution level sensor 21.

Figure 4:
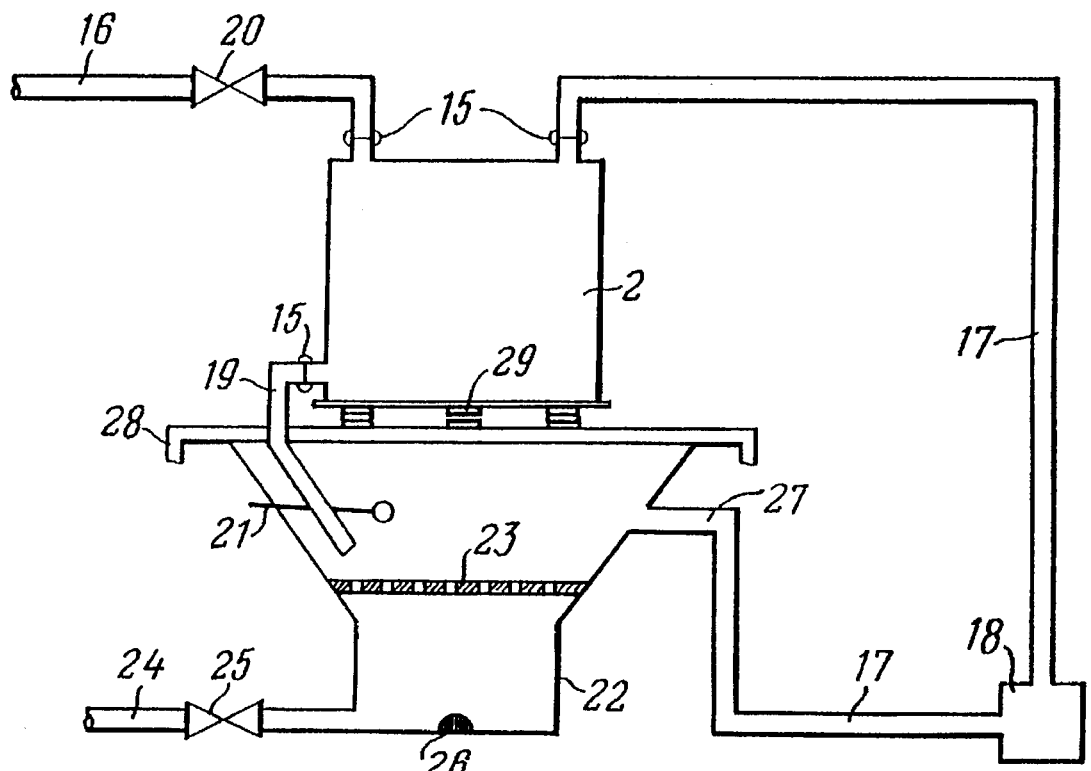
FIG. 4 is a general view of the device for preparing the solution of mineral salt and/or fertilizers, according to the invention.

FIG. 4 illustrates one of the alternative embodiments of a device for preparing solutions of mineral salts and/or fertilizers when the reservoir 22 for bringing the solution to a preset concentration and the remaining equipment are made stationary and the container 2 is installed on a base 28. However, the production equipment may be made not only stationary; it may be installed on any transport means, for example, trucks, ships, railroad vehicles, etc. In this case, it is important to retain the layout of the pipelines 16, 17, 19 and to have the reservoir 22 for bringing the solution to a preset concentration the function of which may be readily performed by any reservoir available in possession of a manufacturer and a user, for example, barrels, silo pits, cisterns, etc. This reservoir may be made, for example, of metal with corrosion-resistant coating, plastic, or of concrete with a coating and may be installed at any convenient level. A container-empty sensor 29 is installed under the container 2.

Figure 5:
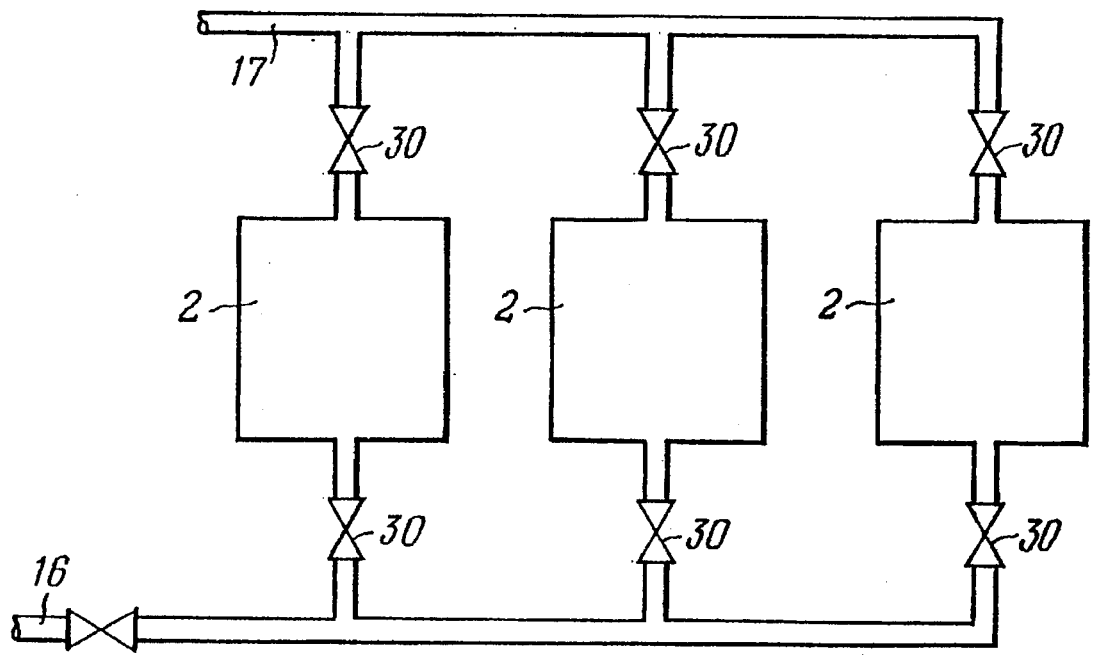
FIG. 5 is a diagram of connection of three transport containers to the system of pipelines used for preparing the solution of mineral salt and/or fertilizer.

The proposed flow diagram advantageously differs from the known flow diagrams by the possibility, depending on demands of the users 4 of making the process of preparing the solution of mineral salts and/or fertilizers uninterrupted without any substantial changes in the basic flow diagram. This aim is readily attained by that a plurality of the containers 2 are simultaneously connected to the solvent delivery pipeline 16 (FIG. 5) and the circulating pipeline 17. The actuating elements for switching over the process of dissolution from one container 2 to another one are presented by valves 20 which are actuated from the sensor 29 (FIG. 4) installed under the container 2 and generating a signal when the container 2 is empty. An optimum number of simultaneously used containers 2 amounts to three. Such a number of containers is in compliance with the time of dissolution and the time required for installing a new container 2.

The proposed device for preparing the solution of salt and/or fertilizer operates in the following manner. A solvent is delivered through the pipeline 16 (FIG. 4) in the container 2 and dissolves a mineral salt or a fertilizer loaded therein in the process of production. The solution flows by gravity through the pipeline 19 into the reservoir 22 for bringing the solution to a preset concentration. As the valve 25 is closed, the reservoir 22 is filled to a required level controlled by the solution level sensor 21. When the sensor 21 operates, the delivery of solvent in the container 2 is automatically cut out by means of the valve 20 and the circulating pump 18 is cut in. As the tapping-off pipe connection 27 for the circulating pipeline 17 is level with the sensor 21, then the solution flows through said circulating pipeline and the circulating pump 18 into the container 2 for further dissolution of a mineral salt and/or a fertilizer. In the process of circulation the density of the solution in lower layers increases and thus ensures the rise of level of the solution with a low concentration and consequently provides an uninterrupted circulation.

When a preset concentration is reached, the density sensor 26 generates a signal for opening the valve 25 due to which the solution of a preset concentration flows through the pipe connection 24 for outlet of the ready-for-use solution to the user 4 (FIG. 1). As the level of the solution has dropped, the sensor 21 (FIG. 4) generates a signal for opening the valve 20 and stopping the pump 18 which ensures a failure-free operation of the pump 18. The solvent flows through the pipeline 16 into the container 2 wherefrom after dissolving the salt and/or the fertilizer it passes through the pipeline 19 in the reservoir 22 for bringing the solution to a preset concentration by a slightly saturated solution. When concentration of the solution in the lower layers of the reservoir 22 decreases, i.e. at the level of the pipe connection 24 the solution density sensor 26 generates a signal for closing the valve 25. When a preset level of the solution is reached, the solution level sensor 21 generates a signal for cutting out the delivery of solvent and for starting the circulating pump 18, i.e. the system is changed over into the initial condition and the solution circulates through the circulating pipeline 17 until it is saturated to a preset concentration. Then the cycle of delivering the ready-for-use solution to the user 4 (FIG. 1) is repeated.

Thus, the process of dissolution may be automatically changed over from one container 2 to another one and their delivery (change) may be semiautomatically accomplished by means, for example, of an autocar or an overhead-track hoist.

If the process of dissolution should be going on more intensively or concentration of the solution should be over 50%, then a heated solvent should be delivered into the container 2. For example, for carbamide the solvent temperature is selected in a range of 20° to 80° C. The given range of temperatures is dictated by the fact that at a temperature higher than 80° C. the process of carbamide decomposition is going on (M. E. Pozin "Technology of Mineral Fertilizer Production" textbook for higher educational institutions, 1983, Publishing House "Khimia", Leningrad, p. 228).

With a rise of temperature concentration of the solution increases. Given in the book (V. A. Klevka, M. N. Polyakov, L. Z. Arsenieva "Technology of Nitrogen Fertilizer Production", 1956, State Publishing House of Chemical Literature, Moscow, p. 266) is a Table illustrating the tendency for increase in concentration of the carbamide solution with a rise of its temperature: at t=20° C. the concentration complies with 51.83%, at t=30° C.–57.18%, at t=70° C.–76.28%, and the speed of dissolution also increases. (R. Rad, T. Sherwood "Properties of Gases and Liquid" (Determination and Correlation), Publishing House "Khimia", Leningrad Section, pp. 598–599).

When using the given device for dissolving the crystalline carbamide in a hydraulically compacted state with a density of 1 g/cm$^2$ and a mass of 1 ton placed in the polypropylene reservoir 10 (FIG. 3) of the container 2 provided with the outer polyethylene reservoir 11, a 50% carbamide solution started to flow out of the pipe connection 24 (FIG. 4) 5 min after the delivery of solvent presented by water at a temperature of 20° C. The whole amount of carbamide placed in the container 2 was dissolved in 15 minutes. In dissolving potassium magnesium sulfate loaded in the container 2, a 40% solution of potassium magnesium sulfate started to flow out 5 min after the loading and the whole process of dissolution was completed in 20 minutes. The data cited hereinbefore make it possible to obtain solutions and other kinds of mineral salts and/or fertilizers.

Thus, a method and an integrated system make it possible to obtain a porous crystalline product direct from the pulp after separation of the mother liquor therefrom. Due to its structure, this product in a definite volume of the container 2 becomes close to a solid product of a preset form and has a small amount of intercrystalline water.

The proposed invention makes it possible to obtain the end product with a substantially reduced (approximately by 7-8 times) content of harmful impurities at the expense of the possibility of eliminating such stages which initiate the increase of said harmful impurities.

However, the known system of providing a user with mineral salts and/or fertilizers contemplates the production at the final stage of the solution with a fixed concentration which makes it impossible to use this solution on soils of different types, as the soils in different locations contain different amounts of nitrogen, phosphorus and potassium. This not only prevents any possibility of an effective use of these fertilizers, but also is detrimental to the soil proper and contributes to growing farm crops with a high content of nitrates, nitrites and other harmful substances having an adverse effect on ecology and human health.

An advantage of the proposed system resides in production of environmentally safe mineral salts and/or fertilizers with minimum productive expenditures and power consumption. The claimed system solves one of the important problems concerning the losses in transportation, storage and use of the mineral salts and/or fertilizers.

The present invention aids in solving a pressing problem of an efficient cooperation between the manufacturer and the user in rendering maintenance services to the user in preparation of solutions with required concentrations and dosages, as well as in solving ecological and economic problems.

The inventors propose a good construction of the container 2 (FIG. 3) which essentially consists of two reservoirs 10, 11 inserted one into the other: the inner reservoir is made of a porous material and serves as a filter in the process of dissolution and the outer reservoir serves for insulation. In addition the outer reservoir 11 is provided with means 12, 13, 14 for connection to the pipelines in the process of loading the container 2 and dissolving mineral salts and/or fertilizers.

An advantage of this construction is defined by the diversity of functions performed by such container 2; it may be used in the production process as a filter for extraction of crystals; in the process of transportation and storage it may be used as a reservoir for storage and protection of the product against atmospheric precipitation and other effects; in the process of dissolution it may be directly used as a reservoir for dissolving the product.

The invention makes it possible to obtain qualitative solutions of a preset concentration without downtimes caused by loading raw materials and also without heavy hand labour, but with high efficiency and speed achieved in preparation of the solution. Along with the acceleration of the production process providing ready-for-use solutions with preset concentrations, the proposed system substantially cuts down losses of raw materials due to the fact that in the process of production the minerals salts and/or fertilizers are loaded in the containers 2, and beginning from this moment and up to their complete dissolution they are kept in one and the same container 2 which was used for dissolving. Closely related to the preceding feature is another important feature of the proposed system residing in that it excludes operation with dust-containing products due to which the production becomes environmentally safe and harmless to the attending personnel.

The proposed system makes it possible to:

reduce the production cycle of mineral salts and/or fertilizers by way of cancelling the treatment of the product with a parting agent, granulation, drying and to cut down the manufacturing cost by 20-25%;

substantially increase the efficiency of the transportation system by application of specialized containers distinguished by simple construction and low manufacturing cost;

introduce a new technology in application of fertilizers providing the conditions for production of environmentally safe products;

exclude the losses of mineral fertilizers during transportation and storage at the expense of improvements in the manufacturer-user scheme;

simplify the hardware and to exclude auxiliary operations from the production process which allows the unit investments to be cut down almost by three times.

Industrial Applicability

The proposed invention may be used to advantage for producing solutions and providing users with solutions of mineral salts and/or fertilizers of different concentrations and different compositions used in chemical, light, food, medical, heavy industries and in agriculture.

Depending on a concrete task; for agriculture—production of mineral fertilizers; for industry—production of solutions of salts, utilization of sodium salt and potassium production wastes; for transport—solving the problems of transportation and transfer; for medical purposes—preparation of solutions for balanced nutrition of men.

We claim:

1. A method for providing an end product made from a mineral salt, a fertilizer, or a mixture thereof, comprising the steps of:

producing, by synthesis, an intermediate product starting from said mineral salt, fertilizer, or mixture thereof, said intermediate product being a pulp;

charging said pulp to a container at a temperature corresponding to the crystallization temperature of said intermediate product with formation of hydraulically compacted crystals;

transporting and storing of said hydraulically compacted crystals in said container; and preparing a solution of said mineral salt, said fertilizer or mixture thereof from said hydraulically compacted crystals immediately prior to a use of said solution.

2. A method according to claim 1, wherein said hydraulically compacted crystals are reloaded to a stationary container in the course of said transportation and storage of said crystals.

3. A method according to claim 1, wherein said mineral salt or fertilizer comprises carbamide.

4. A method according to claim 1, wherein said mineral salt or fertilizer comprises ammonium nitrate.

5. A method according to claim 1, wherein said mineral salt or fertilizer comprises potassium magnesium sulfate.

* * * * *